(12) United States Patent
Scothern

(10) Patent No.: US 10,234,017 B2
(45) Date of Patent: Mar. 19, 2019

(54) COUPLING AND A METHOD OF USING THE SAME

(71) Applicant: ROLLS-ROYCE plc, London (GB)

(72) Inventor: David Peter Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 588 days.

(21) Appl. No.: 14/848,595

(22) Filed: Sep. 9, 2015

(65) Prior Publication Data

US 2016/0102751 A1 Apr. 14, 2016

(30) Foreign Application Priority Data

Oct. 9, 2014 (GB) .................................. 1417859.4

(51) Int. Cl.
*F16H 57/04* (2010.01)
*F04D 1/02* (2006.01)
(Continued)

(52) U.S. Cl.
CPC ........... *F16H 57/0434* (2013.01); *F04D 1/02* (2013.01); *F04D 1/12* (2013.01); *F16H 57/0471* (2013.01);
(Continued)

(58) Field of Classification Search
CPC ... F04D 1/003; F04D 1/02; F04D 1/12; F16C 2360/23; F16H 57/0434
(Continued)

(56) References Cited

U.S. PATENT DOCUMENTS

| 3,093,080 A | * | 6/1963 | Tarifa | ........................ | F04D 1/12 |
| | | | | | 415/143 |
| 3,791,757 A | * | 2/1974 | Tarifa | ........................ | F04D 1/12 |
| | | | | | 415/143 |

(Continued)

FOREIGN PATENT DOCUMENTS

| GB | 1 449 608 A | 9/1976 |
| GB | 2045350 A | 10/1980 |

OTHER PUBLICATIONS

Apr. 8, 2015 Search Report issued in British Application No. 1417859.4.
(Continued)

*Primary Examiner* — Michael R Mansen
*Assistant Examiner* — Mark K Buse
(74) *Attorney, Agent, or Firm* — Oliff PLC

(57) ABSTRACT

A fluid transfer coupling includes a first and second shaft assembly. The first shaft assembly includes a shaft and annular fin attached to shaft, annular fin having one or more internal passages extending therethrough. The or each internal passage connects a center portion of shaft to a radially outwardly facing side of annular fin. The second shaft assembly includes a shaft and annular trough extending radially outwardly of shaft. The first shaft is concentrically accommodated within second shaft with annular fin being accommodated within annular trough. In use, first shaft assembly rotates at a first rotational speed and second shaft assembly rotates at a second rotational speed, with second rotational speed being greater than first rotational speed. The difference between second and first rotational speeds cause a fluid contained within annular trough to be driven radially inwardly through the or each internal passage to center portion of first shaft.

15 Claims, 3 Drawing Sheets

(51) Int. Cl.
*F04D 1/12* (2006.01)
*F04D 1/00* (2006.01)

(52) U.S. Cl.
CPC ......... *F16H 57/0482* (2013.01); *F04D 1/003* (2013.01); *F16C 2360/23* (2013.01)

(58) Field of Classification Search
USPC ........................................ 184/6.12, 70, 13.1
See application file for complete search history.

(56) References Cited

U.S. PATENT DOCUMENTS

| | | | | |
|---|---|---|---|---|
| 4,281,962 A | * | 8/1981 | Erickson | F04D 1/12 415/89 |
| 4,548,545 A | * | 10/1985 | Lewis | F04D 1/12 415/169.1 |
| 4,946,349 A | * | 8/1990 | Manabe | F04C 19/001 415/169.1 |
| 5,135,353 A | * | 8/1992 | Westhoff | F04D 1/12 188/264 R |
| 5,261,784 A | * | 11/1993 | Weber | F04D 1/12 188/161 |
| 5,735,676 A | | 4/1998 | Loos | |
| 6,551,055 B2 | * | 4/2003 | Rockwood | F04D 29/061 184/11.2 |
| 9,719,516 B2 | * | 8/2017 | Neilson | F04D 1/12 |
| 2003/0077165 A1 | * | 4/2003 | Quinn | F04D 1/12 415/89 |
| 2007/0059156 A1 | * | 3/2007 | Blanchard | F04D 1/02 415/90 |
| 2013/0287558 A1 | * | 10/2013 | Buse | F04D 29/2255 415/203 |

OTHER PUBLICATIONS

Apr. 13, 2016 Search Report issued in European Patent Application 15 18 4407.

* cited by examiner

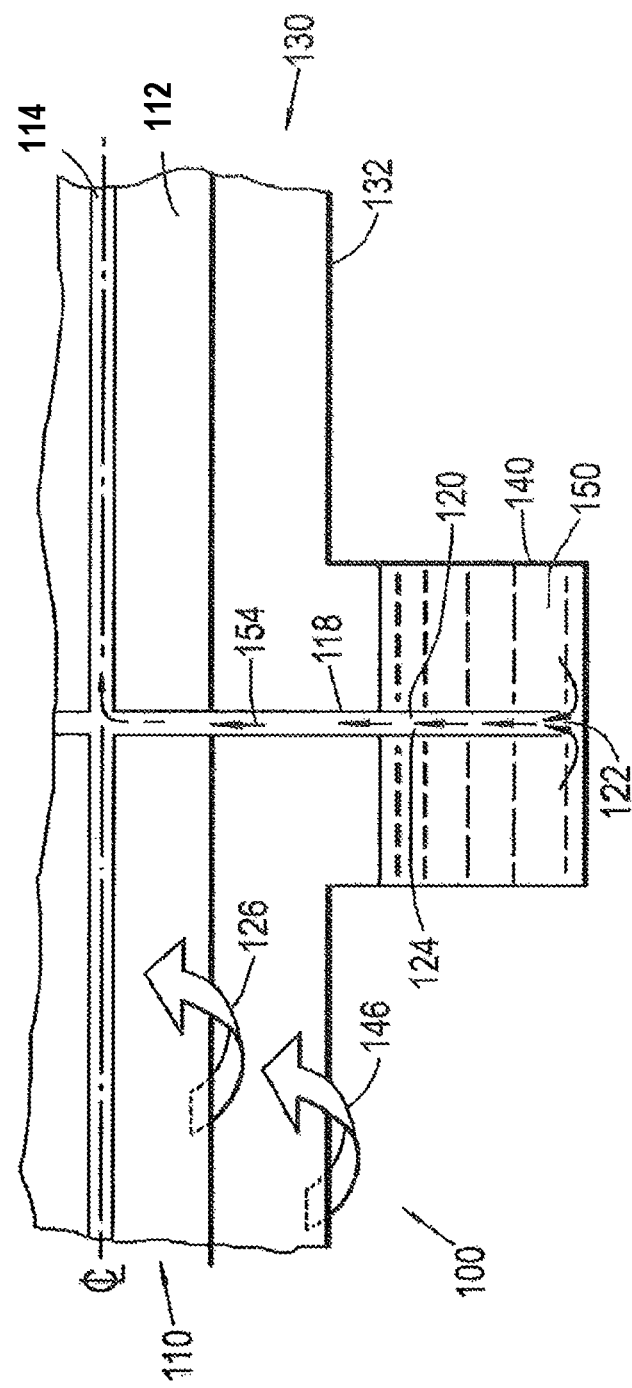

COUPLING AND A METHOD OF USING THE SAME

This disclosure claims the benefit of UK Patent Application No. GB1417859.4, filed on 9 Oct. 2014, which is hereby incorporated herein in its entirety.

FIELD OF THE INVENTION

The present invention relates to a fluid transfer coupling and particularly, but not exclusively, to a fluid transfer coupling for a gas turbine engine.

BACKGROUND TO THE INVENTION

There is a requirement in many rotating systems to be able to transfer fluid under pressure across an interface where there is relative rotation between two parts of the system.

A conventional solution to this requirement involves the use of sliding seals which are then subjected to the difference between the local ambient pressure and the pressure of the fluid being transferred.

A known disadvantage of the use of sliding seals is the potential for seal leakage with the consequent leakage and loss of the transferred fluid. This in turn can have a deleterious effect on components fed by the transferred fluid, such as damage to gears and bearings caused by a loss of lubricant.

In aerospace gas turbine applications, this may cause in-flight engine shutdown, aircraft diversion and/or unplanned engine removal.

An alternative conventional solution to the above-mentioned fluid transfer requirement is the use of a scoop that uses the relative rotation to collect oil from a trough using the dynamic pressure head resulting from the difference in rotation.

A disadvantage of the dynamic scoop approach is that the dynamic pressure head is dependent upon the rate of rotation of the fluid receiving system. In situations where this rate of rotation is low, such as the planet carrier of an epicyclic gearbox, the pressure that may be developed may be insufficient to supply an oil jet or hydraulic actuator with the necessary fluid pressure.

As outlined above, a common aerospace application requiring fluid transfer between rotating components is the planetary epicyclic gearbox used in a gas turbine engine. In one such application, a gearbox input may be connected to the sun gear and rotating at high speed, with a gearbox output being connected to the planet gear carrier and rotating at low speed. It is desirable to be able to supply pressurised oil to the planet bearings.

STATEMENTS OF INVENTION

According to a first aspect of the present invention there is provided a fluid transfer coupling comprising:
a first shaft assembly; and
a second shaft assembly,
the first shaft assembly comprising:
a first shaft; and
an annular fin attached to the first shaft, the annular fin having one or more internal passages extending therethrough, the or each internal passage connecting a centre portion of the first shaft to a radially outwardly facing side of the annular fin,
the second shaft assembly comprising:
a second shaft; and
an annular trough extending radially outwardly of the second shaft,
wherein the first shaft is concentrically accommodated within the second shaft with the annular fin accommodated within the annular trough, and
in use, the first shaft assembly rotates at a first rotational speed and the second shaft assembly rotates at a second rotational speed, the second rotational speed being greater than the first rotational speed, the difference between the second rotational speed and the first rotational speed causes a fluid contained within the annular trough to be driven radially inwardly through the or each internal passage to the centre portion of the first shaft.

The annular fin attached to the first shaft rotates more slowly than the fluid contained within the annular trough. Consequently, the radial acceleration acting on the fluid within the or each internal passage is much lower than the radial acceleration acting on the fluid contained within the annular trough.

As a result the radial pressure gradient within the or each internal passage is lower than that within the main fluid volume within the annular trough. However, the fluid pressure at the radially outwardly facing side of the annular fin must equal the fluid pressure of the fluid within the annular trough.

Thus, this radial pressure gradient will drive the fluid radially inwardly through the or each internal passage from the annular trough to the centre portion of the first shaft.

An advantage of the fluid transfer coupling of the invention is that it can provide a supply of pressurised fluid into a rotating system without reliance on seals whose failure may starve the system of fluid causing failure of the system. This makes the coupling of the invention more reliable than conventional fluid transfer couplings, which is advantageous to a user.

A further advantage of the fluid transfer coupling of the invention is that the fluid pressure developed in the or each internal passage is decoupled from the rotational speed of the first shaft assembly. This makes the fluid transfer coupling of the invention applicable to more applications than conventional fluid transfer couplings, which is more convenient for a user.

Optionally, the or each passage comprises a single annular volume.

In one arrangement, the annular fin is formed from two disc shaped elements positioned side by side with the annular volume formed therebetween. Such an arrangement is simple and cost effective to manufacture making it convenient for a user.

Optionally, the or each passage comprises a plurality of radially extending holes.

In an alternative arrangement, the annular fin is formed as a disc with a plurality of holes extending radially therethrough from a centre portion of the annular fin to a radially outwardly facing side of the annular fin.

In one such alternative arrangement the holes may be formed by machining. In another alternative arrangement the annular fin may be formed as a casting with the holes formed as part of the casting process. In a further alternative arrangement, the annular fin may be formed using a material deposition process with the holes being formed as an integral part of the forming process.

Optionally, the ratio of the second rotational speed to the first rotational speed is between approximately 6:1 and 2:1.

Optionally, the ratio of the second rotational speed to the first rotational speed is between approximately 5:1 and 3:1.

Optionally, the ratio of the second rotational speed to the first rotational speed is approximately 3:1.

Optionally, the first shaft assembly rotates in an opposite direction to the second shaft assembly.

Contra-rotation will reduce the mean speed of the fluid in the annular trough and hence the driving pressure gradient. However, there will be no corresponding reduction in the speed of fluid within the annular fin and the corresponding radial pressure gradient within the or each internal passage. This will reduce the fluid transfer efficiency of the fluid transfer coupling.

Optionally, the or each internal passage comprises one or more radially extending first vanes arranged within the respective passage.

The radially extending first vanes minimise the rotational velocity of the fluid contained within the one or more internal passages. This minimises the radial pressure gradient of the fluid contained within the one or more internal passages, which in turn maximises the pressure of the fluid delivered to the centre portion of the first shaft. This makes the fluid transfer coupling of the invention more efficient.

Optionally, the annular trough comprises a plurality of radially extending second vanes projecting axially into a volume defined by the annular trough.

The radially extending second vanes act to maintain the rotational velocity of the fluid contained within the annular trough close to the rotational velocity of the annular trough itself. This minimises fluid losses caused within the annular trough making the fluid transfer coupling of the invention more efficient.

Optionally, the or each internal passage has an axial dimension of between approximately 0.5 mm and 3 mm.

Optionally, the or each internal passage has an axial dimension of between approximately 0.5 mm and 1.5 mm.

According to a second aspect of the present invention there is provided a method of using a fluid transfer coupling, the fluid transfer coupling comprising a first shaft assembly and a second shaft assembly, the first shaft assembly comprising a first shaft and an annular fin attached to the first shaft, the annular fin having one or more internal passages extending therethrough, the or each internal passage connecting a centre portion of the first shaft to a radially outwardly facing side of the annular fin, the second shaft assembly comprising a second shaft and an annular trough extending radially outwardly of the second shaft, the method comprising the steps of:

(i) arranging the first shaft assembly concentrically within the second shaft assembly;
(ii) driving the first shaft assembly at a first rotational speed and the second shaft assembly at a second rotational speed;
(iii) introducing a supply of fluid to the annular trough; and
(iv) the difference between the second rotational speed and the first rotational speed causing the fluid to be driven radially inwardly from the trough through the or each internal passage to the centre of the first shaft.

Optionally, step (ii) comprises the step of:
(ii)' driving the first shaft assembly at a first rotational speed and the second shaft assembly at a second rotational speed, and the ratio of the second rotational speed to the first rotational speed is between approximately 6:1 and 2:1.

Optionally, step (ii) comprises the step of:
(ii)" driving the first shaft assembly at a first rotational speed and the second shaft assembly at a second rotational speed, and the ratio of the second rotational speed to the first rotational speed is between approximately 5:1 and 3:1.

Optionally, step (ii) comprises the step of:
(ii)''' driving the first shaft assembly at a first rotational speed and the second shaft assembly at a second rotational speed, and the ratio of the second rotational speed to the first rotational speed is approximately 4:1.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIG. 1 shows a schematic sectional view of a fluid transfer coupling according to a first embodiment of the invention;

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 2A:
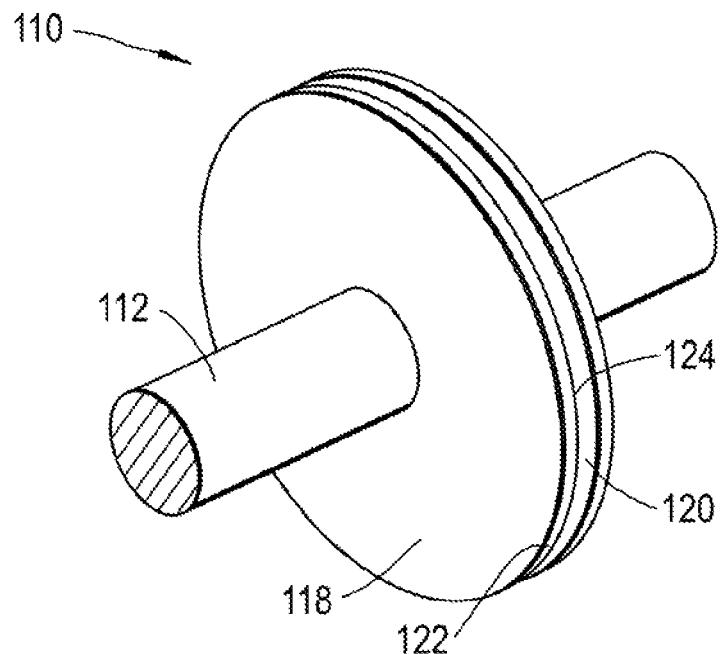
FIG. 2A shows a schematic perspective view of a first shaft assembly of the fluid transfer coupling of FIG. 1.

Referring to FIGS. 1 and 2A, a fluid transfer coupling according to a first embodiment of the invention is designated generally by the reference numeral 100. The fluid transfer coupling 100 comprises a first shaft assembly 110 and a second shaft assembly 130. In the embodiment shown, the fluid transfer coupling forms part of an epicyclic gearbox (not shown) within a gas turbine engine (not shown).

Speed ratios will be an output of the wider engine architecture—the trough will rotate with the power gearbox input (or sun) gear, while the fin will rotate with the output (planet carrier).

Each of the first shaft assembly 110 and the second shaft assembly 130 is formed from a alloy steel suitable for use in an epicyclic gearbox.

The first shaft assembly 110 comprises a first shaft 112, and an annular fin 118 attached to the first shaft 112. The first shaft has a centre portion 114. In the present embodiment the centre portion 114 is a hole extending axially along the centre line of the first shaft 112. This hole may be used to feed pressurised fluid along the first shaft 112.

The annular fin 118 comprises an internal passage 120 formed as a single annular volume 124 which fluidly connects the centre portion 114 of the first shaft 112 to a radially outwardly facing side 122 of the annular fin 118. In other words, the annular fin 118 is formed as two discs axially spaced apart from one another to thereby form the single annular volume 124 therebetween.

In the present arrangement of the fluid transfer coupling 100, the annular fin 118 is separately formed, for example by machining, casting or an alternative manufacturing process, and subsequently attached to the first shaft 112.

The second shaft assembly 130 comprises a second shaft 132 and an annular trough 140 extending radially outwardly of the second shaft 132.

The first shaft 110 is concentrically accommodated within the second shaft 130 with the annular fin 118 accommodated within the annular trough 140.

This concentric arrangement of the first and second shaft assemblies requires that the first shaft assembly 110 be assembled inside the second shaft assembly 130.

In one arrangement, the annular trough 140 is separately formed, for example by machining, forging, casting or another manufacturing process, and subsequently attached to the second shaft 132.

In use the first shaft assembly 110 rotates at a first rotational speed 126 and the second shaft assembly 130 rotates at a second rotational speed 146. The second rotational speed 146 is greater than the first rotational speed 126.

In the present example, the second rotational speed 146 is four (4) times greater than the first rotational speed 126. In other examples of the invention, this ratio of the second rotational speed 146 to the first rotational speed 126 may be between approximately two (2) and six (6) to one (1).

This difference in rotational speed between second shaft assembly 130 and the first shaft assembly 110 causes a radial pressure gradient between the fluid within the annular volume 124 and the fluid 150 within the annular trough 140. This results in the fluid 150 contained within the annular trough 140 being driven radially inwardly through the annular volume 124 to the centre portion 114 of the first shaft 112 as a fluid flow 154.

Figure 2B:
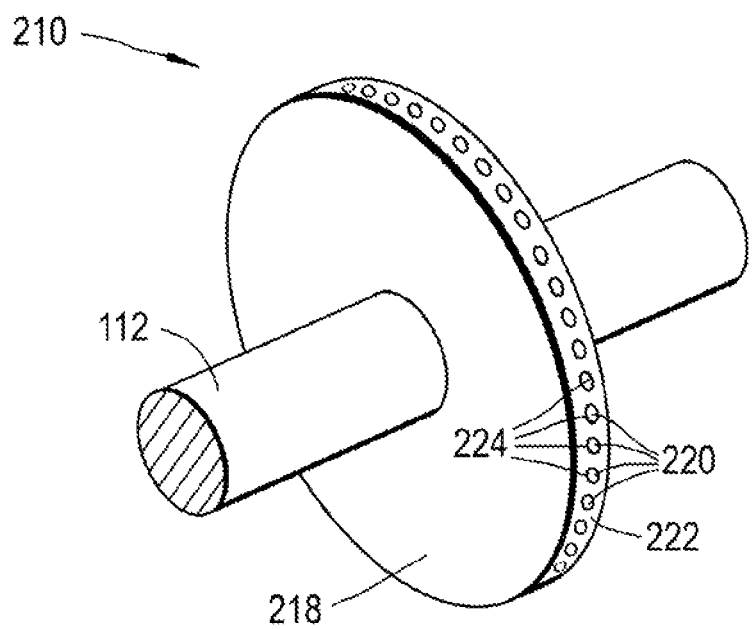
FIG. 2B shows a schematic perspective view of a first shaft assembly of a fluid transfer coupling according to a second embodiment of the invention.

FIG. 2B shows a first shaft assembly 210 of a fluid transfer coupling 200 according to a second embodiment of the invention. Features of the first shaft assembly 210 which correspond to those of first shaft assembly 110 have been given corresponding reference numerals for ease of reference.

In the first shaft assembly 210 of this arrangement comprises a first shaft 112 and an annular fin 218. The annular fin 218 is attached to the first shaft 112.

The annular fin 218 comprises one or more internal passages 220. In this arrangement, the one or more internal passages 220 are formed as a plurality of holes 224, each of the holes 224 extending radially outwardly from the centre portion 114 of the first shaft 112 to a radially outwardly facing side 222 of the annular fin 218.

In use the fluid transfer coupling 200 operates in the same manner as outlined above in respect of the fluid transfer coupling 100.

Figure 3:
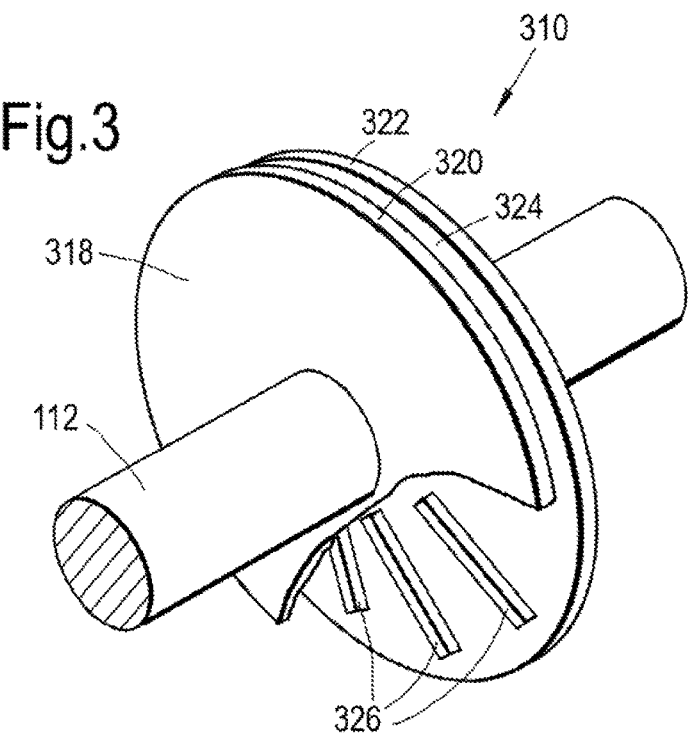
FIG. 3 shows a schematic partial sectional perspective view of a first shaft assembly of a fluid transfer coupling according to a third embodiment of the invention.

FIG. 3 shows a first shaft assembly 310 of a fluid transfer coupling 300 (not shown) according to a third embodiment of the invention. Features of the first shaft assembly 310 which correspond to those of first shaft assembly 110 have been given corresponding reference numerals for ease of reference.

In this arrangement, the first shaft assembly 310 comprises a first shaft 112 and an annular fin 318 attached to the first shaft 112. As outlined above for the previous embodiments, the annular fin 318 comprises one or more internal passages 320 in the form of a single annular volume 324.

The annular volume 324 fluidly connects the centre portion 114 of the first shaft 112 to a radially outwardly facing side 322 of the annular fin 318.

In this arrangement, the annular volume 324 is provided with a plurality of radially extending first vanes 326. These vanes 326 serve to minimise the circumferential velocity of fluid contained within and being driven through the annular volume 324.

In the example illustrated in FIG. 3, the first vanes 326 are equi spaced circumferentially around the annular fin 318. In other arrangements, the first vanes may be unequally spaced around the circumference of the annular fin 318.

The first vanes 326 are shown as extending substantially linearly in a radial direction within the annular volume 324. In other arrangements the first vanes 326 may be curved in the radial direction.

Although illustrated with reference to the single annular volume 124 of the first embodiment of the fluid transfer coupling, it is to be understood that the radially extending first vanes 326 may equally be applied to the plurality of holes 224 of the second embodiment of the fluid transfer coupling 200.

In use the fluid transfer coupling 300 operates in the same manner as outlined above in respect of the fluid transfer coupling 100.

Figure 4:
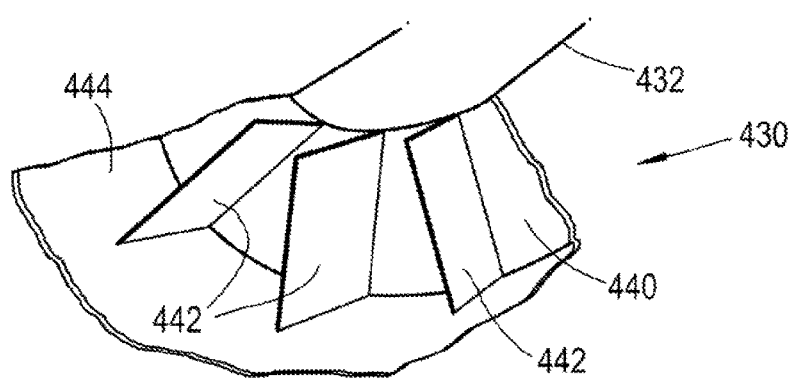
FIG. 4 shows a schematic partial perspective view of an annular trough of a fluid transfer coupling according to a fourth embodiment of the invention.

FIG. 4 shows a second shaft assembly 430 of a fluid transfer coupling 400 (not shown) according to a fourth embodiment of the invention that is designated generally by the reference numeral 400.

The fluid transfer coupling 400 comprises a first shaft assembly 110 and a second shaft assembly 430. The first shaft assembly 110 is as described above.

In this arrangement, the second shaft assembly 430 comprises a second shaft 432 and an annular trough 440 extending radially outwardly of the second shaft 432.

The annular trough 440 comprises a plurality of radially extending second vanes 442 projecting axially into a volume 444 defined by the annular trough 440.

In the arrangement of FIG. 4, these second vanes 442 extend axially from only one side of the annular trough 440. In other arrangements, the second vanes 442 may extend from both sides of the annular trough 440 into the volume 444.

In use the fluid transfer coupling 400 operates in the same manner as outlined above in respect of the fluid transfer coupling 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A fluid transfer coupling comprising:
a first shaft assembly; and
a second shaft assembly,
the first shaft assembly comprising:
a first shaft; and
an annular fin attached to the first shaft, the annular fin having one or more internal passages extending therethrough, the or each internal passage connecting a hollow center portion of the first shaft to a radially outwardly facing side of the annular fin, and the hollow center portion extends axially in opposite directions where fluid exits the or each internal passage, the second shaft assembly comprising:

a second shaft; and an annular trough extending radially outwardly of the second shaft, wherein the first shaft is concentrically accommodated within the second shaft with the annular fin accommodated within the annular trough, and the first shaft assembly is configured to rotate at a first rotational speed and the second shaft assembly is configured to rotate at a second rotational speed, the second rotational speed being greater than the first rotational speed, the difference between the second rotational speed and the first rotational speed causing the fluid contained within the annular trough to be driven radially inwardly through the or each internal passage to the center portion of the first shaft.

2. The fluid transfer coupling as claimed in claim 1, wherein the or each internal passage comprises a single annular volume.

3. The fluid transfer coupling as claimed in claim 1, wherein the or each internal passage comprises a plurality of radially extending holes.

4. The fluid transfer coupling as claimed in claim 1, wherein the ratio of the second rotational speed to the first rotational speed is between approximately 6:1 and 2:1.

5. The fluid transfer coupling as claimed in claim 1, wherein the ratio of the second rotational speed to the first rotational speed is between approximately 5:1 and 3:1.

6. The fluid transfer coupling as claimed in claim 1, wherein the ratio of the second rotational speed to the first rotational speed is approximately 3:1.

7. The hydraulic coupling as claimed in claim 1, wherein the first shaft assembly rotates in an opposite direction to the second shaft assembly.

8. The fluid transfer coupling as claimed in claim 1, wherein the or each internal passage comprises one or more radially extending first vanes arranged within the respective passage.

9. The fluid transfer coupling as claimed in claim 1, wherein the annular trough comprises a plurality of radially extending second vanes projecting axially into a volume defined by the annular trough.

10. The fluid transfer coupling as claimed in claim 1, wherein the or each internal passage has an axial dimension of between approximately 0.5 mm and 3 mm.

11. The fluid transfer coupling as claimed in claim 1, wherein the or each internal passage has an axial dimension of between approximately 0.5 mm and 1.5 mm.

12. A method of using a fluid transfer coupling, the fluid transfer coupling comprising a first shaft assembly and a second shaft assembly, the first shaft assembly comprising a first shaft and an annular fin attached to the first shaft, the annular fin having one or more internal passages extending therethrough, the or each internal passage connecting a hollow center portion of the first shaft to a radially outwardly facing side of the annular fin, and the hollow center portion extends axially in opposite directions where fluid exits the or each internal passage, the second shaft assembly comprising a second shaft and an annular trough extending radially outwardly of the second shaft, the method comprising the steps of:

(i) arranging the first shaft assembly concentrically within the second shaft assembly;

(ii) driving the first shaft assembly at a first rotational speed and the second shaft assembly at a second rotational speed;

(iii) introducing a supply of the fluid to the annular trough; and (iv) the difference between the second rotational speed and the first rotational speed causing the fluid to be driven radially inwardly from the trough through the or each internal passage to the center of the first shaft.

13. The method as claimed in claim 12, wherein in step (ii), the ratio of the second rotational speed to the first rotational speed is between approximately 6:1 and 2:1.

14. The method as claimed in claim 12, wherein in step (ii), the ratio of the second rotational speed to the first rotational speed is between approximately 5:1 and 3:1.

15. The method as claimed in claim 12, wherein in step (ii), the ratio of the second rotational speed to the first rotational speed is approximately 4:1.

* * * * *